United States Patent
Curtis et al.

(10) Patent No.: US 9,211,041 B2
(45) Date of Patent: Dec. 15, 2015

(54) ADAPTABLE SENSORLESS END OF STROKE DETECTION SYSTEM AND METHOD

(71) Applicant: GOJO Industries, Inc., Akron, OH (US)

(72) Inventors: Chip W. Curtis, West Dundee, IL (US); Jackson W. Wegelin, Stow, OH (US); Shelby J. Buell, Medina, OH (US)

(73) Assignee: GOJO Industries, Inc., Akron, OH (US)

( * ) Notice: Subject to any disclaimer, the term of this patent is extended or adjusted under 35 U.S.C. 154(b) by 188 days.

(21) Appl. No.: 13/791,394

(22) Filed: Mar. 8, 2013

(65) Prior Publication Data

US 2014/0151394 A1    Jun. 5, 2014

Related U.S. Application Data

(60) Provisional application No. 61/733,468, filed on Dec. 5, 2012.

(51) Int. Cl.
| | |
|---|---|
| *H02P 3/08* | (2006.01) |
| *A47K 5/12* | (2006.01) |
| *H02P 1/04* | (2006.01) |
| *H02P 1/18* | (2006.01) |
| *H02P 31/00* | (2006.01) |

(52) U.S. Cl.
CPC ............... *A47K 5/1217* (2013.01); *H02P 1/04* (2013.01); *H02P 1/18* (2013.01); *H02P 3/08* (2013.01); *H02P 31/00* (2013.01)

(58) Field of Classification Search
USPC .......... 318/430–433, 466–468, 481, 482, 484
See application file for complete search history.

(56) References Cited

U.S. PATENT DOCUMENTS

| | | | | |
|---|---|---|---|---|
| 5,714,854 | A * | 2/1998 | Mizuta et al. | 318/266 |
| 6,864,654 | B1 * | 3/2005 | Letor et al. | 318/434 |
| 7,453,224 | B2 * | 11/2008 | Sullivan | 318/433 |
| 2011/0278322 | A1 | 11/2011 | Reynolds | |
| 2012/0006848 | A1 | 1/2012 | Reynolds | |
| 2012/0091938 | A1 | 4/2012 | Knezevic | |

FOREIGN PATENT DOCUMENTS

| | | |
|---|---|---|
| EP | 2109211 A1 | 10/2009 |
| WO | 2008093213 A1 | 8/2008 |

OTHER PUBLICATIONS

International Search Report and Written Opinion from International Application No. PCT/US2013/073208, date of mailing Nov. 6, 2014.

* cited by examiner

*Primary Examiner* — Bentsu Ro
(74) *Attorney, Agent, or Firm* — Calfee, Halter & Griswold LLP

(57) ABSTRACT

Embodiments of methods of controlling a motor for driving a load are disclosed herein. Exemplary methods include providing energy to a motor, sensing a parameter indicative of current. Determining the end of an inrush current and a start point that is after the inrush current and that is at about the beginning of a main current draw. Determining an end point at about the end of the main current draw. Continuing to provide energy to the motor for a time period that is a function of the time from the start point to the end point and de-energizing the motor.

22 Claims, 4 Drawing Sheets

ADAPTABLE SENSORLESS END OF STROKE DETECTION SYSTEM AND METHOD

RELATED APPLICATIONS

This non-provisional utility patent application claims priority to and the benefits of U.S. Provisional Patent Application Ser. No. 61/733,468 filed on Dec. 5, 2012, and entitled ADAPTABLE SENSORLESS END OF STROKE DETECTION SYSTEM AND METHOD. This application is incorporated herein by reference in its entirety.

TECHNICAL FIELD

The present invention relates generally to adaptable sensorless end of stroke detection, and more particularly to end of stroke detection systems and methods for electronic dispensers and methods of determining whether a proper refill unit is installed in a dispenser.

BACKGROUND OF THE INVENTION

It is often desirable to stop a motor that moves an item or object during a certain point along its desired path or at its end-of-stroke position. For example, in some touch-free electronic dispensers, such as soap or sanitizing dispensers, a motor may move an actuator to drive a portion of a pump to pump a fluid and then move the portion of the pump back to its original position to re-prime the pump chamber, and the motor is stopped so that the actuator is positioned at its end of stroke so that it is positioned and ready to drive the actuator to dispense another dose of fluid. It is common to equip such dispensers with an "end-of-stroke" switch so that the processor in the dispenser can determine when the actuator has reached the end of its travel and stop the motor. The use of an end-of-stroke switch increases the cost of the dispenser and requires additional wiring and/or a circuit board to place the switch in circuit communication with the processor that controls the motor.

In addition, manufacturers of dispensers often provide dispensers to customers at little to no charge and sell proprietary refill units for use in those dispensers. In some instances, unscrupulous users purchase unauthorized refill units and use those unauthorized refill units in the dispensers.

SUMMARY

Embodiments of methods of controlling a motor for driving a load are disclosed herein. Some exemplary methods include (i) providing energy to a motor; (ii) sensing a parameter indicative of current; (iii) determining the end of an inrush current and a start point that is after the inrush current and that is at about the beginning of a main current draw; (iv) determining an end point at about the end of the main current draw; (v) continuing to provide energy to the motor for a time period that is a function of the time from the start point to the end point; and (vi) de-energizing the motor.

Another exemplary method for stopping a device at the end of its motion includes energizing a motor and sensing a parameter indicative of a main current draw; measuring the length of time from about the beginning of a main current draw to about the end of the main current draw; allowing the motor to be energized for an additional time period that is a function of the time of main current draw; and de-energizing the motor.

In addition, exemplary methods of inactivating an electric dispenser if an unauthorized refill is installed in the dispenser are provided. Some exemplary methods include providing an electronic dispenser having a motor to drive a pump, a processor, memory having one or more pump load profiles stored in the memory, and a receiver for receiving a refill unit that includes a pump. The method includes providing power to the motor to drive the pump of a refill unit and measuring one or more parameters indicative of the pump load on the motor. The methodology further includes comparing the measured pump load to the one or more stored pump load profiles and determining whether the measured load profile is related to a stored pump load profile. The methodology further includes disabling the electronic dispenser until a new refill unit is installed if the measured load profile is not related to a stored pump load profile and enabling operation of the electronic dispenser if the load profile is related to a stored pump load profile.

Exemplary embodiments of end-of-stroke detection systems are also disclosed herein. One exemplary system includes a motor, a sensor for sensing a parameter indicative of a current, a processor, and logic stored on a processor readable medium. The logic is configured to determine a first time period indicative of a main current draw wherein the main current draw occurs between a point where the inrush current decreases and a point where the current draw levels off. The logic is configured to continue to provide power to the motor for a second time period that is a function of the first time period.

In addition, exemplary embodiments of refill units for automatic dispensers are disclosed herein. One exemplary refill unit includes a container for holding a fluid and a pump connected to the container for pumping the fluid. The pump includes a housing and a load profile. The load profile is generated by causing a measurable characteristic to occur during an operation cycle, wherein the measurable characteristic is detectable by a dispenser during the operation cycle, and the dispenser continues to operate if the measureable characteristic occurs and does not operate if the measurable characteristic does not occur during the operation cycle.

BRIEF DESCRIPTION OF THE DRAWINGS

These and other features and advantages of the present invention will become better understood with regard to the following description and accompanying drawings in which.

DETAILED DESCRIPTION

Figure 1:
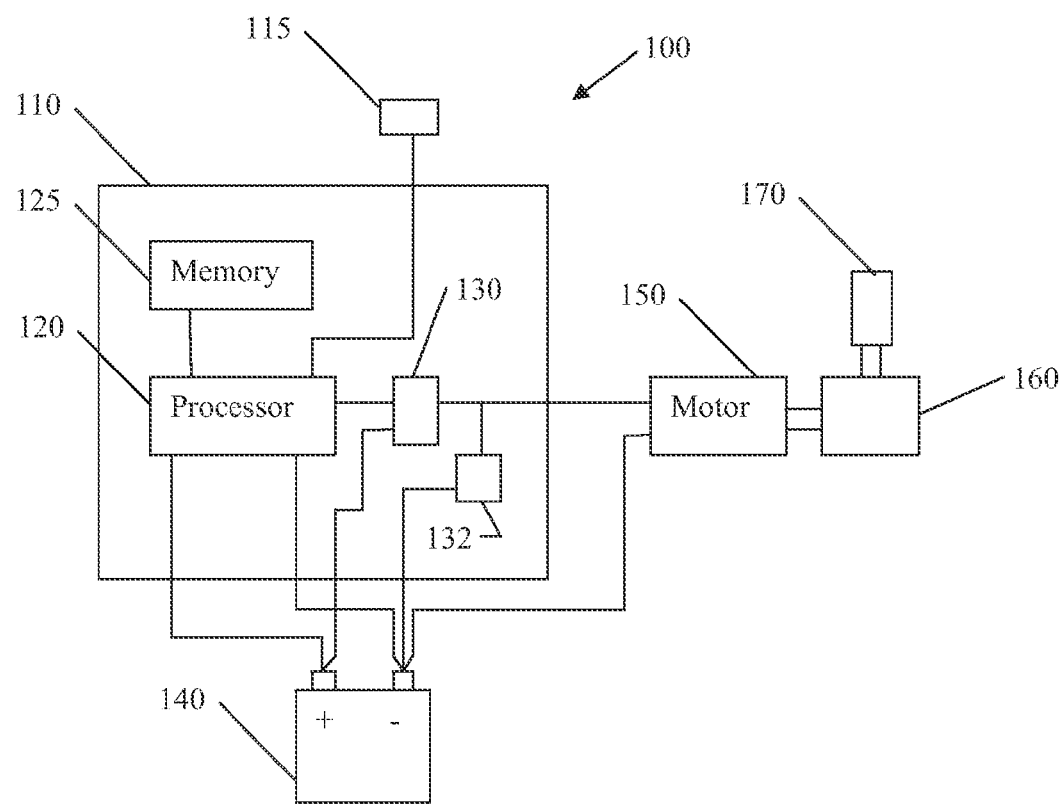
FIG. 1 is an exemplary system for controlling a motor.

FIG. 1 illustrates a simplified generic embodiment of an exemplary system 100 for a motor driving a load. Exemplary embodiments described herein are for dispensers, such as, for example, soap or sanitizer dispensers and methods of controlling motors that operate such dispensers. However, embodiments of the invention may be used with other motors where it is desired to stop the motor with the load driven to a certain point, such as to an end of stroke.

System 100 includes a circuit board 110 that includes a processor 120, a switch 130 and a load sensor 132. Load sensor 132 may be any type of load sensor and may provide any type of feedback signal indicative of current to the processor. Thus, the feedback signal may be current, voltage, power, such as for example wattage, or the like. Power is provided by one or more batteries 140. The system also includes a motor 150 that drives an actuator 160 (and associated gearing, not shown) that in turn drives a pump 170. An object sensor 115 is also included in system 100.

During operation, object sensor 115 detects an object and provides a signal to processor 120. Processor 120 causes switch 130 to energize the motor 150, which drives the actuator 160 and operates the pump 170. A load sensor 132 provides feedback to processor 120. As described in detail below, processor 120 uses the feedback from load sensor 132 to determine when to turn off switch 130 to de-energize the motor 150.

Figure 2:
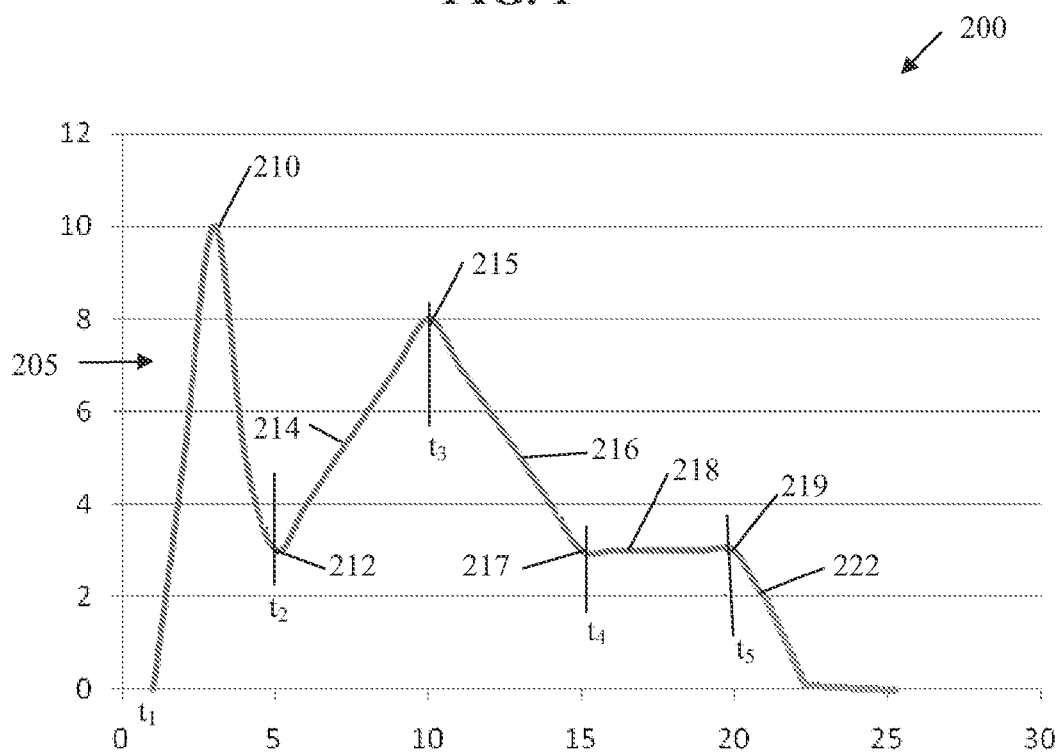
FIG. 2 is an exemplary load profile for a motor driving an actuator and a pump.
Figure 4:
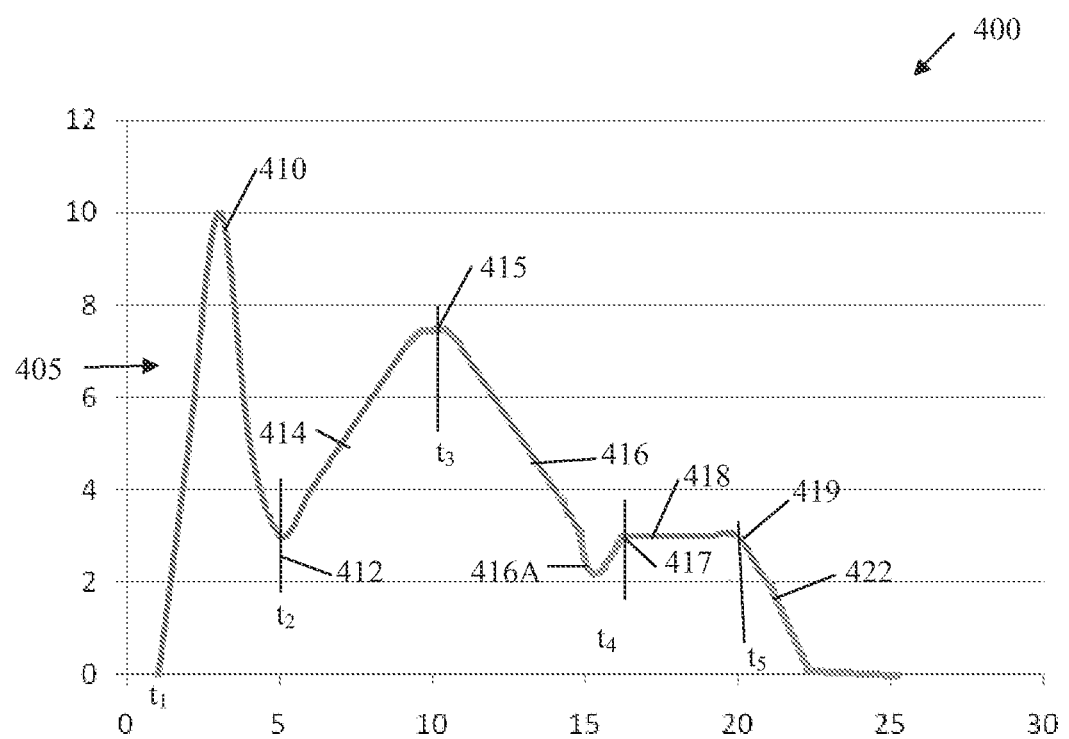
FIG. 4 is another exemplary load profile for a motor driving an actuator and a pump.
Figure 5:
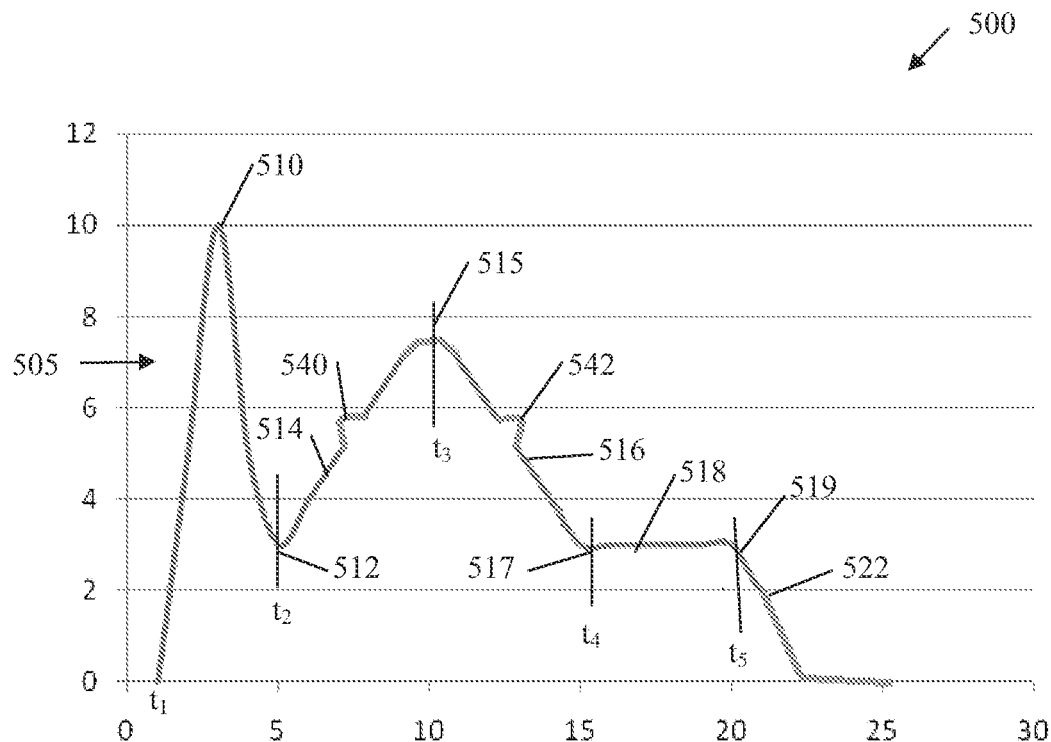
FIG. 5 is another exemplary load profile for a motor driving and actuator and a pump.

Exemplary feedback signals provided by load sensor 132 to processor 120 are illustrated in FIGS. 2, and 4-5 below. In these exemplary embodiments, the motor current is shown on the y-axis and time (t) is shown on the x-axis. The scaling units on the x-axis and y-axis are illustrative and are not intended to indicate a specific current or a specific time.

Curve 205 of FIG. 2 illustrates a motor current draw for driving a touch-free dispenser over time (t). In this embodiment, the motor is connected to an actuator that drives a liquid piston pump. The curve 205 illustrates the current as the liquid piston pump is driven in a first direction to dispense a liquid and driven in a second direction to re-prime the pump. It also illustrates the current as the actuator releases from the pump and moves to a desired end-of-actuator stroke position.

At time $t_1$ the touch-free dispenser is activated, which energizes the motor and causes an inrush current spike that peaks at point 210 and tapers off to a lower current at time $t_2$ at or about point 212. Then, the current gradually increases along line 214 to peak 215 at time $t_3$, as the pump is driven to dispense the fluid. The motor current gradually decreases along line 216 as the pump is re-primed. As the pump reaches its end of travel, the current begins to level off at time $t_4$, point 217, as the actuator releases from the pump. The leveled off current continues along line 218 until the current to the motor is cut off at time $t_5$, point 219. The current tapers off and decrease to O along line 222 as the motor stops.

Figure 3:
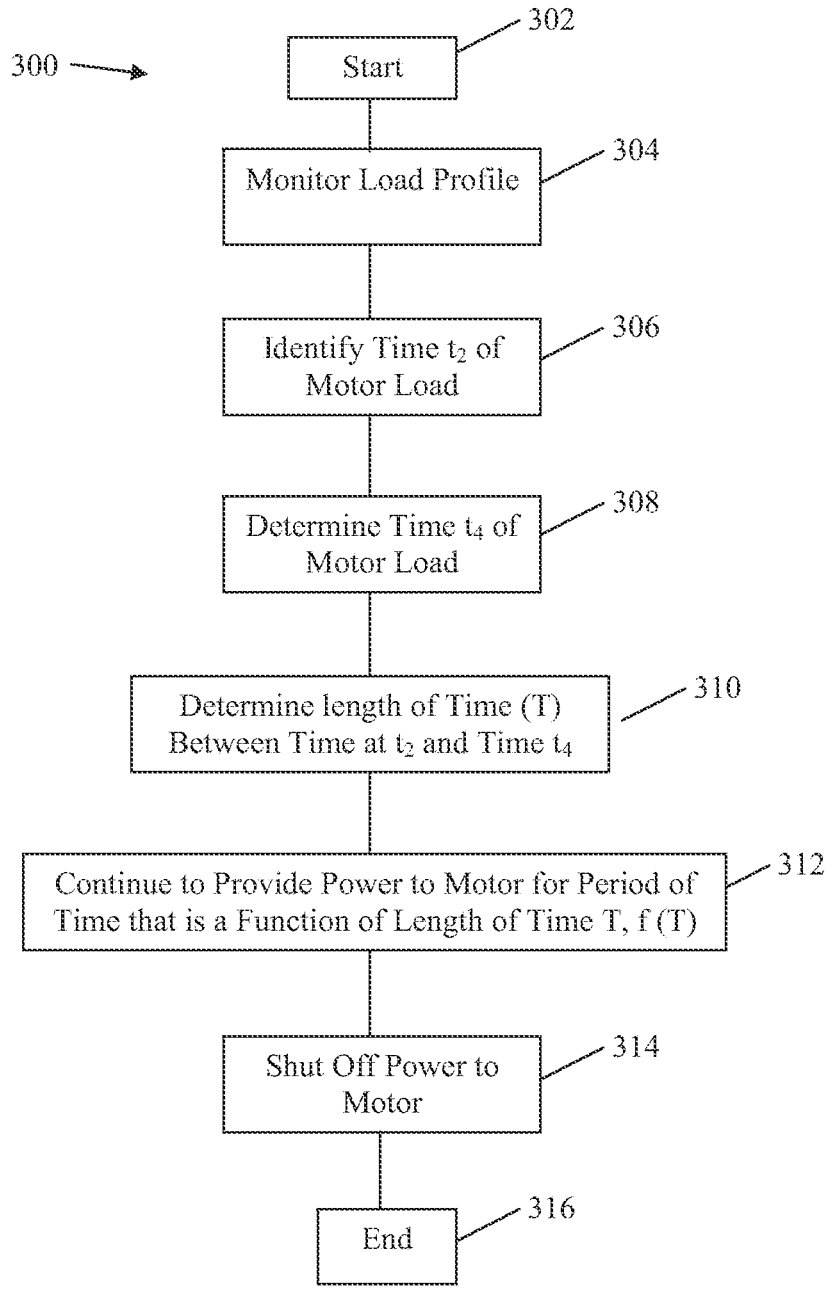
FIG. 3 is an exemplary logic diagram for controlling a motor.

FIG. 3 illustrates an exemplary methodology 300 of control logic used by processor 120 to control motor 150. Although the blocks in methodology 300 are shown and described in a certain order, the exemplary steps may be completed in different orders, different combinations, with additional steps and/or without certain steps, all of which are included in the scope of the present invention. In addition, although the exemplary methodology 300 is described using a load profile with motor current, other types of units that are indicative of the motor load may be used and are within the scope of the present invention.

The methodology begins at block 302 and the motor is energized. The load profile, such as, for example current draw, is monitored at block 304. At block 306, time $t_2$ is determined. Time $t_2$ is a point in time that is after the inrush current has subsided and that is at the time the motor starts driving the pump, or the start of the main current draw. Time $t_4$ is determined at block 308. Time $t_4$ is a point in time that is at the end of the stroke of the pump where the actuator 160 disengages from the pump 170, or the end of the main current draw. At block 310, processor 120 determines the length of time T from time $t_2$ to time $t_4$. Processor 120 continues to power motor 150 for an additional time that is a function of the length of time T ("f(T)"). The motor is de-energized at block 314 and the methodology ends at block 316.

In some embodiments f(T) may be T/2. Thus, if the length of time T from the time at time $t_2$ to the time at time $t_4$ is one second, then the processor would continue to energize the motor for an additional half second after time $t_2$. This methodology is self-adjusting and provides a number of advantages. For example, as the battery voltage gets lower, the time T increases because at a lower voltage, the motor moves slower. Accordingly, the time that the motor drives the actuator after releasing from the pump also increases as a function of T. Thus, as the battery nears the end of its life, the motor continues to drive the actuator to the end of its stroke.

In some embodiments, it is useful to measure the length of time of the inrush current from time $t_1$ to time $t_2$ and use that time period to predict the length of time for the inrush current on the next dispense or operation of the motor. One exemplary use for such data is for stall detection. Thus if, for example, the length of time of the inrush current exceeds a predicted length of time by a certain percentage, the circuitry may de-energize the motor.

In some embodiments, the length of time between two points may be calculated and stored for comparison to future lengths of time to determine certain operating parameters such as, for example, expected battery life. For example, the length of time from time $t_1$ to time $t_5$ (or any set length in between) may be measured and stored during the first dispense after the batteries are changed. An increase in the length of time that is over a threshold value may be used to provide a user with an indication that the batteries should be replaced.

FIG. 4 illustrates another exemplary load profile 400. Similar to curve 205, curve 405 illustrates a motor current draw for driving a touch-free dispenser over time (t). At time $t_1$ the touch-free dispenser is activated which energizes the motor and causes an inrush current spike that peaks at point 410 and tapers off to a lower current at time $t_2$ at or about point 412. Then, the current gradually increases along line 414 to peak 415 at time $t_3$, as the pump is driven to dispense the fluid. The motor current gradually decreases along line 416 as the pump is re-primed. In this embodiment, the pump (not shown) includes a spring (not shown) to move the pump back to its original position. Accordingly, the spring may overdrive the motor near the end of the pump stroke and cause a voltage dip 416A, which may even result in a negative current. In such circumstances, the processor is configured to ignore the dip and determine when the current begins to level off at time $t_4$, point 417, which is shown along line 418. The current to the motor is cut off at time $t_5$, point 419, and the motor current decreases to O along line 422 as the motor stops. As described above, the processer determines the time $t_5$ that the motor is de-energized as a function of the length of time T from time $t_2$ to time $t_4$.

FIG. 5 illustrates another exemplary motor load 500. The motor load curve 505 is similar to motor load curve 205 of FIG. 2. In this embodiment, the motor is connected to an actuator that drives a liquid piston pump. The curve 505 illustrates the current as the liquid piston pump is driven in a first direction to dispense a liquid and driven in a second direction to re-prime the pump. It also illustrates the current as the actuator releases from the pump and moves to a desired end-of-actuator-stroke position. At time the touch-free dispenser is activated, which energizes the motor which causes an inrush current spike that peaks at point 510 and tapers off to a lower current at time $t_2$ at or about point 512. Then, the current gradually increases along line 514 toward peak 515 at time $t_3$ at point 515. A spike 540 occurs during the gradual increase. Spike 540 is intentionally caused by the design of the pump or load that the motor is moving. In one exemplary embodiment, the pump (not shown) contains a bump or ridge (not shown) on the piston that contacts the pump housing (not shown). The bump or ridge causes a spike 540 in the motor load as the motor moves the bump or ridge past the housing. The curve gradually decreases from peak 515 along line 516 as the pump is re-primed. During the gradual decrease a spike 542 occurs. Spike 542 is also intentional and caused by the same design that caused spike 540. As the pump travels its full length the current begins to level off at time $t_4$, point 517, as the actuator releases from the pump and the current levels off along line 518. The current to the motor is cut off at time $t_5$, point 519, and the motor current decreases to O along line 522 as the motor stops.

In one exemplary embodiment, spike 540 and spike 542 may be used by the processor to identify whether a refill unit containing a pump is a proprietary refill unit or whether the refill unit is an unauthorized product. For example, if the processor expects spikes 540 and 542 but does not measure any spikes, the processor may shut down the dispenser and not operate until a new refill unit is installed in the dispenser. Other indicia of a proprietary refill unit may be derived as a function of the load curve profile such as, for example, power required to operate the pump, overdriving caused by a spring or resilient member, a length of time to operate at a certain voltage or the like.

Figure 6:
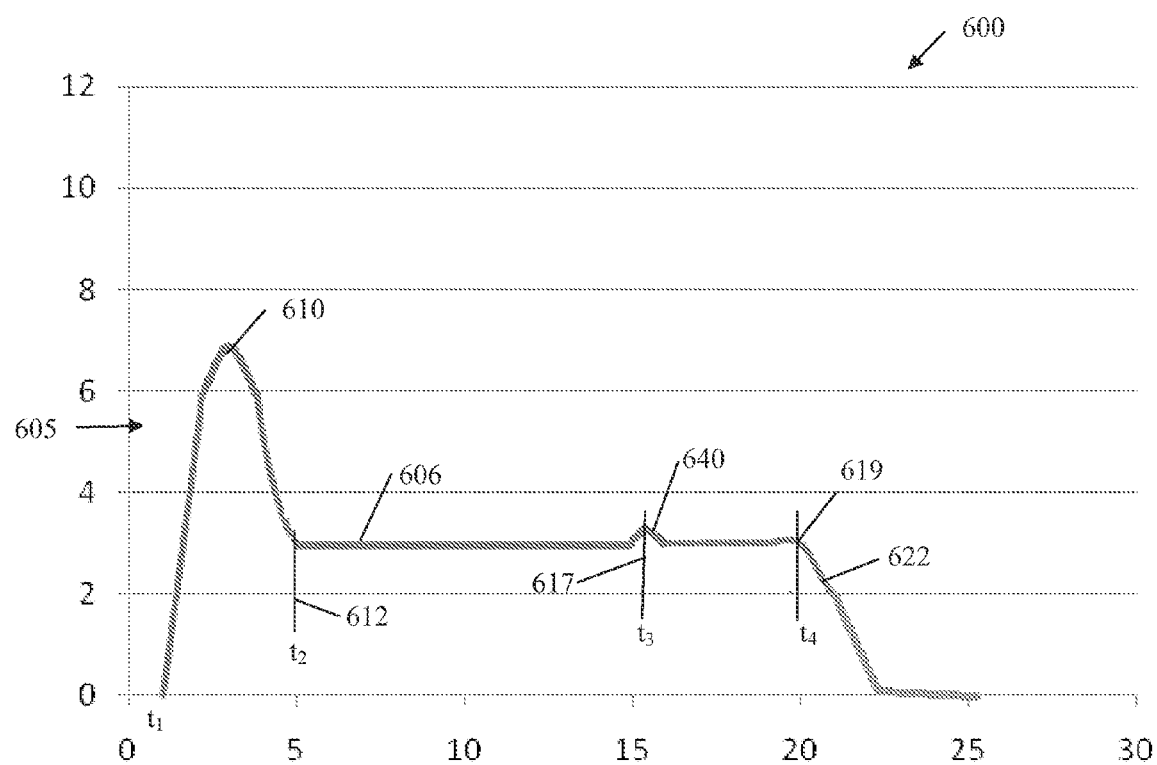
FIG. 6 illustrates an exemplary load profile for a motor driving an actuator.

In one exemplary embodiment for a touch-free dispenser (not shown), a load profile illustrated in FIG. 6 for the motor 150 moving the actuator 160 is used to control the motor 150. In this exemplary embodiment, the pump 170 and its associated refill unit (not shown) are not installed in the dispenser. At the time the touch-free dispenser is activated, the motor is energized which causes an inrush current spike that peaks at point 610 and tapers off to a lower current along line 606 at time $t_2$ at or about point 612. A spike 640 occurs at a time $t_3$, point 617, in the movement of the actuator. This point 617 may correspond to the end-of-stroke of the piston of a liquid pump if the pump were installed in the dispenser. Spike 640 is intentionally caused by a load (not shown) built into the system, such as a spring, a bump in the plastic, a missing gear tooth, or the like that causes a spike at a set point of travel. After detection of the spike, the motor 150 may continue to be run to move actuator 160 for an additional length of time (T) until time $t_4$, point 619, to position the actuator in its correct position for loading a new refill unit and liquid pump. The current to the motor is cut off at time $t_4$, point 619, and the motor current decreases to O along line 622 as the motor stops.

The additional length of time may be a function of the time from time $t_2$ to time $t_3$. In some embodiments, the length of time is a function of the length of time of a previous operation of the dispenser with a liquid pump installed in the dispenser. In some embodiments, the length of time may be a set time. In some embodiments, the length of time may be a function of the battery voltage. In some embodiments, the length of time may be a function of the time from time $t_1$ to time $t_3$ or the like.

The exemplary embodiments disclosed herein may be used separately or combined with other embodiments. In addition, various elements from the exemplary embodiments may be used separately or combined with selected elements from one or more other exemplary embodiments disclosed herein.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

We claim:

1. A method of controlling a motor for driving a pump comprising:
   providing energy to a motor;
   sensing a parameter indicative of current;
   wherein the current includes an inrush current and a main draw current of the motor,
   determining the end of the inrush current;
   determining a start point that is after the inrush current and that is at about the beginning of the main current draw;
   determining an end point at about the end of the main current draw;
   continuing to provide energy to the motor for a time period that is a function of the time from the start point to the end point; and
   de-energizing the motor.

2. The method of claim 1 wherein the parameter indicative of current is a function of the voltage.

3. The method of claim 1 wherein the parameter indicative of current is a function of power.

4. The method of claim 1 wherein the parameter indicative of the current is a function of time.

5. The method of claim 1 wherein the start point is at about the beginning of an increase in current.

6. The method of claim 1 wherein the end point is at about the beginning of leveling off of current.

7. The method of claim 1 wherein the time period is about one-half of the time from the start point to the end point.

8. The method of claim 1 further comprising coupling the motor to the pump.

9. The method of claim 1 wherein providing energy to a motor comprises providing battery power to the motor.

10. The method of claim 1 wherein the time period is a function of the battery voltage and a function of the time from the start point to the end point.

11. A method for stopping a pump at the end of its motion comprising:
    energizing a motor;
    sensing a parameter indicative of a main current draw of the motor;
    measuring the length of time from about a beginning of the main current draw to about the end of the main current draw;
    allowing the motor to be energized for an additional time period that is a function of the time of main current draw; and
    de-energizing the motor.

12. A method of controlling a motor for driving a pump comprising:
    providing energy to a motor;
    sensing a parameter indicative of current of the motor;
    identifying a start point of a main current draw of the motor;
    identifying an end point of the main current draw of the motor;
    continuing to provide energy to the motor for a time period that is a function of the time from the start point of the main current draw to the end point of the main current draw; and de-energizing the motor.

13. The method of claim 12 wherein the parameter indicative of current is a function of the voltage.

14. The method of claim 12 wherein the end point is at about the beginning of leveling off of current.

15. The method of claim 12 wherein the time period is about one-half of the time from the start point to the end point.

16. The method of claim 12 wherein providing energy to a motor comprises providing battery power to the motor.

17. The method of claim 12 wherein the time period is a function of the battery voltage and a function of the time from the start point to the end point.

18. A method for controlling a pump at the end of a motion comprising:
   energizing a motor;
   sensing a parameter indicative of a main current draw of the motor;
   identifying a length of time from about a beginning of the main current draw to about an end of the main current draw;
   energizing the motor for an additional time period that is a function of the time of main current draw; and
   de-energizing the motor.

19. The method of claim 18 wherein the parameter indicative of current is a function of the voltage.

20. The method of claim 18 wherein the start point is at about the beginning of an increase in current.

21. The method of claim 18 wherein the end point is at about the beginning of leveling off of current.

22. The method of claim 18 wherein the time period is about one-half of the time from the start point to the end point.

* * * * *